United States Patent
Dharawat et al.

(10) Patent No.: US 8,677,503 B2
(45) Date of Patent: Mar. 18, 2014

(54) MECHANISM FOR EMBEDDING DEVICE IDENTIFICATION INFORMATION INTO GRAPHICAL USER INTERFACE OBJECTS

(75) Inventors: Parikshit H. Dharawat, Sunnyvale, CA (US); Su-Yin Gan, Santa Clara, CA (US); Ji Hye Jung, Palo Alto, CA (US); Ansuman Tapan Satpathy, Sunnyvale, CA (US)

(73) Assignee: Motorola Mobility LLC, Libertyville, IL (US)

( * ) Notice: Subject to any disclaimer, the term of this patent is extended or adjusted under 35 U.S.C. 154(b) by 258 days.

(21) Appl. No.: 12/984,245

(22) Filed: Jan. 4, 2011

(65) Prior Publication Data
US 2012/0174232 A1 Jul. 5, 2012

(51) Int. Cl.
G06F 21/00 (2013.01)
G06F 21/36 (2013.01)
G06F 21/16 (2013.01)

(52) U.S. Cl.
CPC ............. *G06F 21/36* (2013.01); *G06F 21/16* (2013.01)
USPC .......................................... 726/26; 713/176

(58) Field of Classification Search
CPC .................................. G06F 21/36; G06F 21/16
USPC ............................................ 713/176; 726/26
See application file for complete search history.

(56) References Cited

U.S. PATENT DOCUMENTS

| | | | |
|---|---|---|---|
| 5,818,454 A * | 10/1998 | Arai et al. ...................... 345/593 |
| 6,069,955 A * | 5/2000 | Coppersmith et al. .......... 380/54 |
| 6,345,104 B1 | 2/2002 | Rhoads | |
| 7,194,105 B2 * | 3/2007 | Hersch et al. ................. 382/100 |
| 7,220,535 B2 * | 5/2007 | Lawandy et al. .............. 430/336 |
| 7,254,837 B2 * | 8/2007 | Fields ............................ 726/27 |
| 7,349,987 B2 * | 3/2008 | Redlich et al. ................ 709/244 |
| 7,393,623 B2 * | 7/2008 | Conroy et al. ............. 430/270.1 |
| 7,415,607 B2 * | 8/2008 | Sinn ............................... 713/158 |
| 7,546,334 B2 * | 6/2009 | Redlich et al. ................ 709/201 |
| 7,681,134 B1 * | 3/2010 | Grechishkin et al. ......... 715/740 |
| 7,797,740 B2 | 9/2010 | Blom et al. | |
| 7,958,268 B2 * | 6/2011 | Redlich et al. ................ 709/246 |
| 8,015,600 B2 * | 9/2011 | Sinn et al. ....................... 726/10 |
| 8,141,052 B2 * | 3/2012 | Guarraci ........................ 717/127 |
| 8,272,055 B2 * | 9/2012 | Wease ............................. 726/23 |
| 8,346,929 B1 * | 1/2013 | Lai .................................. 709/226 |
| 8,421,593 B2 * | 4/2013 | Brandin ......................... 340/5.8 |
| 8,468,244 B2 * | 6/2013 | Redlich et al. ................ 709/225 |
| 8,538,886 B1 * | 9/2013 | Iu et al. ............................ 705/51 |
| 8,571,993 B2 * | 10/2013 | Kocher et al. .................. 705/56 |
| 2001/0034835 A1 * | 10/2001 | Smith ............................. 713/175 |
| 2007/0154060 A1 * | 7/2007 | Sun ................................ 382/100 |

(Continued)

OTHER PUBLICATIONS

Potdar et al., "Tamper Detection in RFID Tags using Fragile Watermarking",Industrial Technology, 2006. ICIT 2006. Publication Year: 2006 , pp. 2846-2852.*

(Continued)

*Primary Examiner* — Hadi Armouche
*Assistant Examiner* — Angela Holmes

(57) ABSTRACT

A mechanism for protecting software and computing devices from unintentional pre-release disclosure ("leak") is provided that includes applying a security enhancement to an object on the graphical user interface of the computing device such that the object can be used to visually determine the origin of the leak without obstructing the user's experience or being easily detected or defeated.

5 Claims, 10 Drawing Sheets

(56) References Cited

U.S. PATENT DOCUMENTS

| | | | |
|---|---|---|---|
| 2008/0059802 A1* | 3/2008 | Cohen et al. | 713/176 |
| 2009/0007016 A1* | 1/2009 | Lindberg et al. | 715/835 |
| 2009/0249244 A1* | 10/2009 | Robinson et al. | 715/781 |
| 2009/0254862 A1* | 10/2009 | Viginisson et al. | 715/810 |
| 2010/0325649 A1* | 12/2010 | Anguiano | 725/25 |
| 2012/0039021 A1* | 2/2012 | Karwan | 361/679.01 |
| 2012/0174232 A1* | 7/2012 | Dharawat et al. | 726/26 |

OTHER PUBLICATIONS

Ke et al. "A novel fragile watermark applying in verification ", IEEE International Conf. Neural Networks and Signal Processing ,Nanjing, China, Dec. 14-17, 2003 , pp. 1501-1504.*

Zhou et al., "An additive-attack-proof watermarking mechanism for databases' copyrights protection using image ", SAC '07: Proceedings of the 2007 ACM symposium on Applied computing, Mar. 11-15, 2007, ACM 1-59593-480-04/07/0003.*

U.S. Appl. No. 61/226,988, filed Jul. 20, 2009, Galicia et al.
U.S. Appl. No. 12/838,868, filed Jul. 19, 2010, Galicia et al.
U.S. Appl. No. 61/226,974, filed Jul. 20, 2009, Galicia et al.
U.S. Appl. No. 12/838,668, filed Jul. 19, 2010, Galicia et al.
U.S. Appl. No. 61/226,955, filed Jul. 20, 2009, Galicia et al.
U.S. Appl. No. 12/839,069, filed Jul. 19, 2010, Galicia et al.
U.S. Appl. No. 61/291,269, filed Dec. 30, 2009, Galicia et al.
U.S. Appl. No. 12/838,984, filed Jul. 19, 2010, Galicia et al.
U.S. Appl. No. 12/839,193, filed Jul. 19, 2010, Galicia et al.
International Mobile Equipment Identity, From Wikipedia, the free encyclopedia, obtained at Internet address http://en.wikipedia.org/wiki/International_Mobile_Equipment_Identity, on Dec. 20, 2010, 5 pages.
Web desktop, From Wikipedia, the free encyclopedia, obtained at Internet address http://en.wikipedia.org/wiki/Web_desktop, on Jan. 4, 2011, 6 pages.

* cited by examiner

| NUMBER | COLOR |
|--------|-----------|
| 0 | "#F2F2F2" |
| 1 | "#FF7256" |
| 2 | "#CD96CD" |
| 3 | "#8B7355" |
| 4 | "#EEB422" |
| 5 | "#CAFF70" |
| 6 | "#40F0D0" |
| 7 | "#EEDD82" |
| 8 | "#BA55D3" |
| 9 | "#B0C4DE" |

*FIG. 5*

MECHANISM FOR EMBEDDING DEVICE IDENTIFICATION INFORMATION INTO GRAPHICAL USER INTERFACE OBJECTS

TECHNICAL FIELD

The present invention relates to using a computer device and method to identify device information.

BACKGROUND

Computer software companies and computing device manufacturers generally take care in protecting the unintended leaking and release of pictures, snapshots, screenshots, etc. of software and computing devices especially before the software or devices are available for use and/or sale to consumers. Despite that care, the aforementioned may be publically disclosed before intended through many means including inside employees' and/or third-party operators'/testers' intentional or unintentional disclosure. Additionally, software and devices may be unintentionally lost, stolen, or intentionally left in a public place for public disclosure. Such public disclosure may jeopardize the impact of a new product on the market. Currently, it is very difficult to identify and trace the device from where the leak came based on the captured screenshot images.

One such method currently used to attempt to trace back the leak is using metadata such that if a user were to take a screenshot of the pre-release software/device, the software will embed hidden metadata, such as Exchangeable Image File Format (EXIF) metadata, International Press Telecommunications Council (IPTC) metadata, and/or Extensible Metadata Platform (XMP) metadata into the print-screen/screenshot/screen-capture that may provide identifying information about the device performing the screenshot when viewed on a device capable of reading such metadata. For example, when performing a screenshot, the software may be programmed to capture an image of the device's desktop screen, web-based home screen, web-based desktop ("webtop"), network-based home screen, or network-based desktop, as well as to store the device's identification information into the generated screenshot file. When read by a machine capable of reading metadata, the metadata may be revealed. But metadata fails to protect against leaked software and computing device disclosure for a number of reasons. First, there exists software to remove/scrub metadata such that the screenshot may be disseminated without the metadata. Second, if the image of the software/device is captured by a system outside the device itself (e.g., an external camera as opposed to using print-screen to capture a screenshot) the metadata is not captured by the external device. Therefore, hidden metadata fails to protect software and devices from unpermitted disclosure.

Accordingly, there exists a need in the art for a mechanism for protecting the unintended disclosure of computer software or devices without being easily detected or defeated.

BRIEF DESCRIPTION OF THE SEVERAL VIEWS OF THE DRAWINGS

The embodiments will be further described in connection with the attached drawing figures. It is intended that the drawings included as a part of this specification be illustrative of the exemplary embodiments and should in no way be considered as a limitation on the scope of the invention. Indeed, the present disclosure specifically contemplates other embodiments not illustrated but intended to be included in the claims.

FIG. 5 is an exemplary color key table.

DETAILED DESCRIPTION OF PRESENTLY PREFERRED EMBODIMENTS

Figure 1:
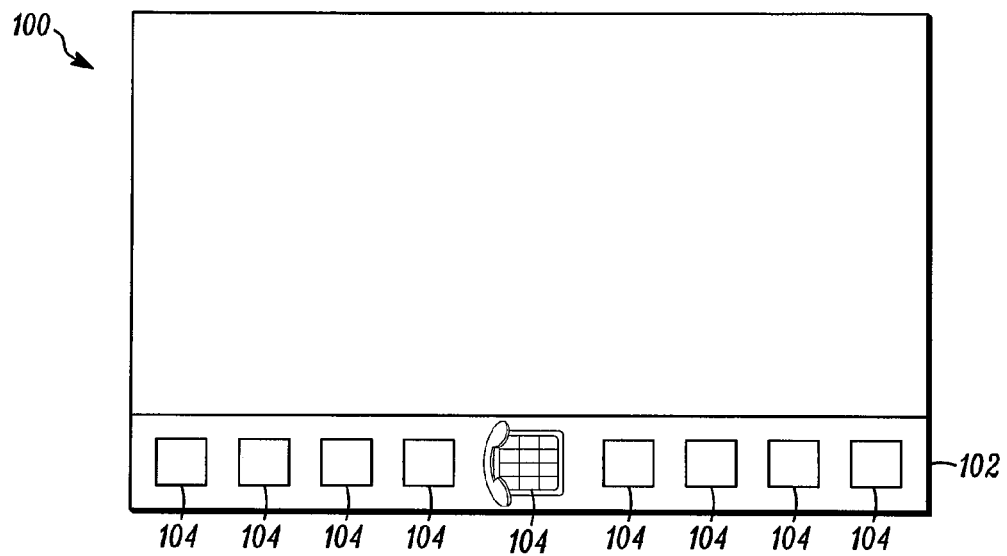
FIG. 1 is an exemplary webtop.

The exemplary embodiments illustrated herein provide exemplary devices, mechanism, and methods for security enhancing objects of a computing device to determine the source of unintended disclosure. The present invention is not limited to those embodiments described herein, but rather, the disclosure includes all equivalents.

A more detailed description of the embodiments will now be given with reference to FIGS. 1-11. Throughout the disclosure, like reference numerals and letters refer to like elements. The present disclosure is not limited to the embodiments illustrated; to the contrary, the present disclosure specifically contemplates other embodiments not illustrated but intended to be included in the claims.

Figure 3A:
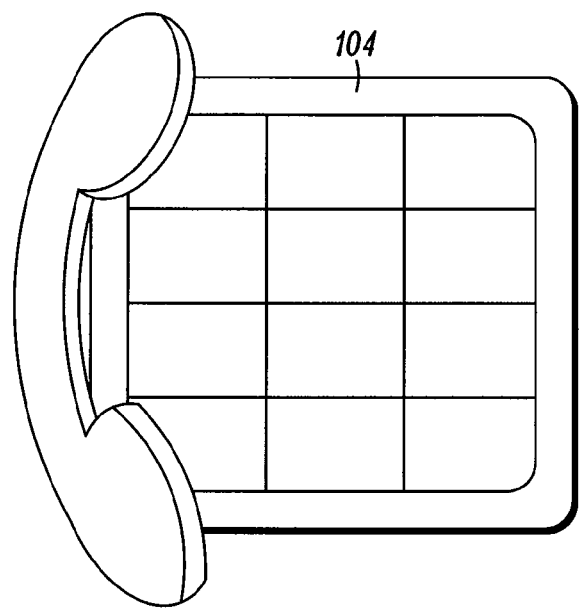
FIG. 3a is an exemplary icon.

FIG. 1 is an exemplary webtop 100 for use on mobile or stationary computing devices, which include, but are not limited to, mobile phones, satellite phones, mobile personal computers (PC), netbooks, laptop computers, handheld computers, smart phones (including but not limited to Blackberry™ (offered for sale by Research in Motion™), Palm Pilot™ (offered for sale by Palm™), iPhone™ (offered for sale by Apple™) devices, etc.), navigation systems, personal digital assistants (PDA), calculators, music players (including but not limited to, an MP3 player, iPod™ device (offered for sale by Apple™), etc.), tablet computers (including but not limited to, iPad™ device (offered for sale by Apple™), etc.) and desktop computers. Webtop 100 is, for example, a graphical user interface that interfaces with a backend service, such as Android, which interfaces with the device's operating system, such as Linux (a Unix™-type operating system) or Windows™ (offered for sale by Microsoft™). A webtop is like a desktop for use on a mobile or stationary device (such as a computer), but most of the application icons 104 appearing in application tray 102 are Internet-based applications or those that at least gather a portion of their information or content from the Internet. Although an exemplary webtop is illustrated herein, the embodiments and any equivalents would be equally applicable, including but not limited to, a computing device's desktop screen, web-based home screen, network-based home screen, network-based desktop, etc. Icons 104 are objects illustrated here as not being security-enhanced, and another exemplary non-security-enhanced icon is illustrated in FIG. 3a.

Figure 2:
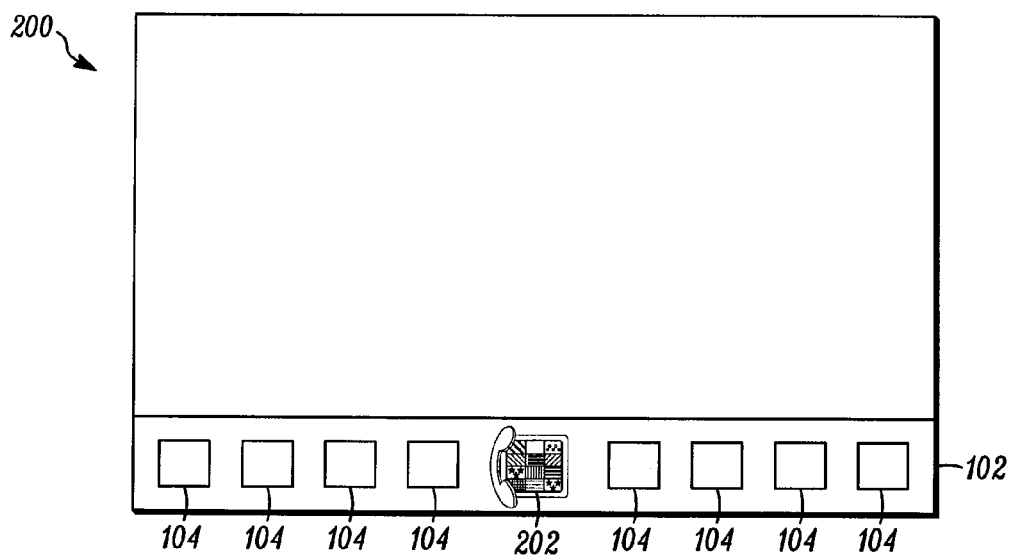
FIG. 2 is an exemplary security-enhanced webtop.
Figure 3B:
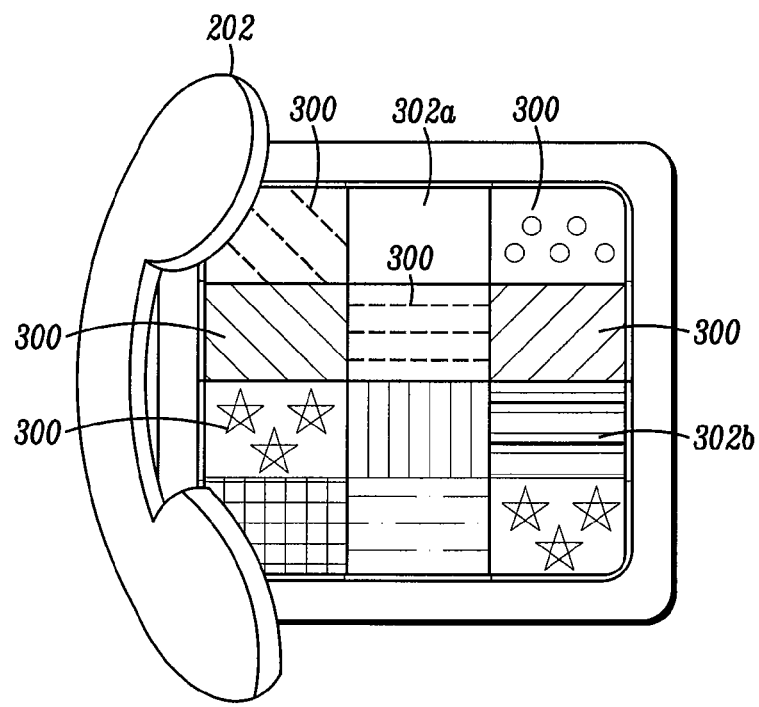
FIG. 3b is an exemplary security-enhanced icon.

FIG. 2 illustrates an exemplary security-enhanced webtop 200 having a security-enhanced icon 202. FIG. 3b also illustrates an exemplary security-enhanced icon. Security-enhanced icon 202 (illustrated in FIGS. 2 and 3b) has at least one visual image security enhancement 300 for identifying the device on which icon 202 originated.

Figure 4:
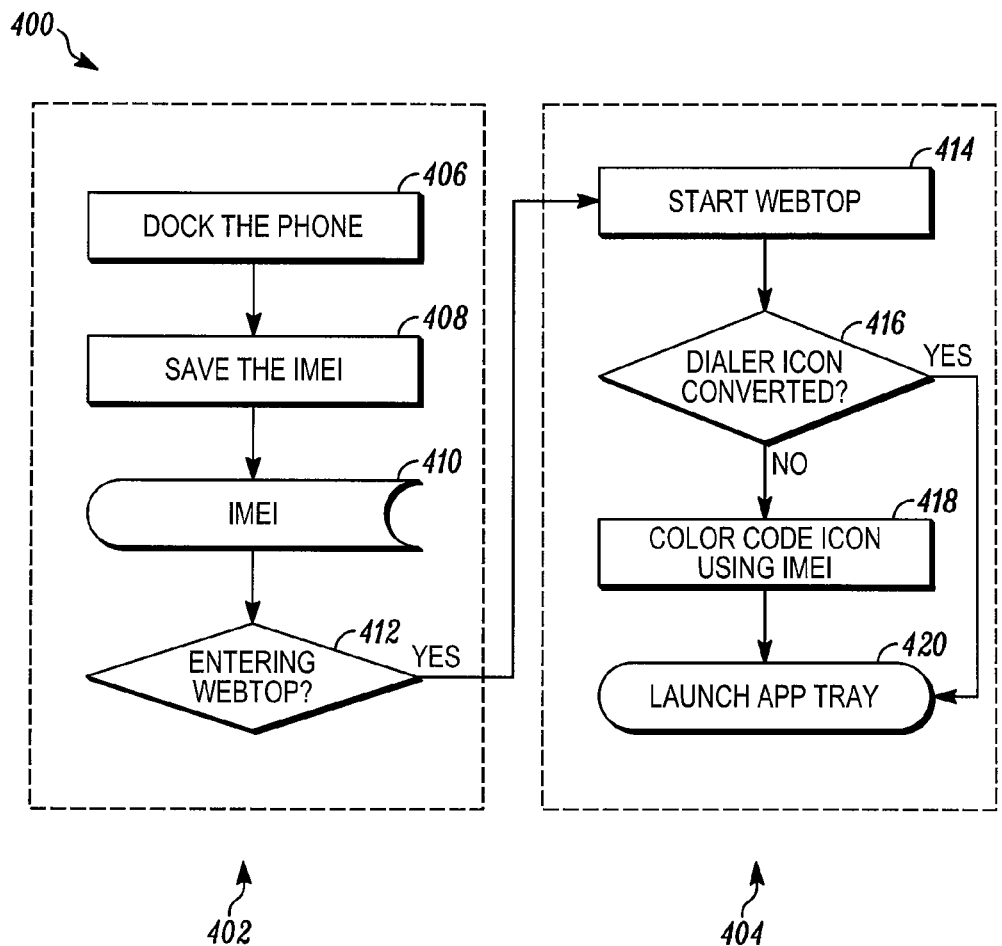
FIG. 4 is an exemplary flow chart illustrating a method for security enhancing an icon.

FIG. 4 is an exemplary flow chart illustrating a method for security enhancing an icon. Icon 202 (FIG. 3b) is enhanced by following a protocol 400 that can be used on any computing device, be it mobile or stationary, having at least one unique identifier associated with it. A unique identifier is not limited to identifying a single device; rather, it may identify a group of devices.

A mobile phone, for example, is assigned a unique identifier called an International Mobile Equipment Identity (IMEI). The IMEI can be translated to determine who owns the phone or at least what network the phone uses (e.g., Verizon™, AT&T™, etc.) Although the IMEI is illustrated throughout, use of any unique identifier of a computing device (or group of computing devices) is contemplated, including but not limited to a serial number, Electronic Serial Number (ESN), Mobile Equipment Identifier (MEID), International Mobile Subscriber Identity (IMSI) (typically stored on a sim card), Mobile Subscriber Integrated Services Digital Network Number/Mobile Station International Subscriber Directory Number (MSISDN), or any other identifier including, but not limited to, numbers, letters, symbols, strings, characters, and/or identifiers or any portion or combination thereof.

FIG. 4 illustrates interaction between Android service 402 and the webtop 404. As illustrated in FIG. 4, once the phone is docked, at block 406, the IMEI is saved at block 408 via Android service interface 402. IMEI, at block 410, is then passed to webtop which is entered and started, at blocks 412, 414. When webtop starts, it then determines whether icon 104 (FIG. 1) is enhanced with the security features, at block 416. If it is, application tray 102 (FIG. 1) is launched, at block 420. If icon 104 is not enhanced with security features, it is color coded using at least a portion of the digits of the IMEI, at block 418, that correspond to a visual enhancement lookup table, and at block 420 the application tray is launched displaying the security enhanced icon. Although FIG. 4 illustrates Android service 402 and webtop 404, any graphical user interface can benefit from this method, including graphical user interface systems and operating systems for use on mobile and stationary computing devices.

Figure 6:
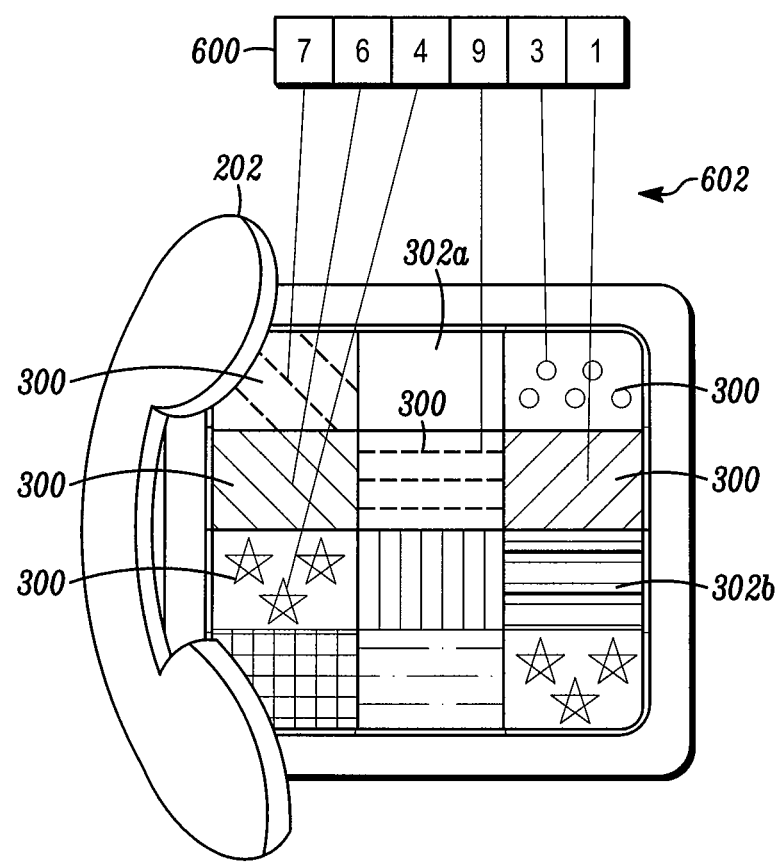
FIG. 6 is an exemplary color mapping to an exemplary security-enhanced icon.

FIG. 5 is an exemplary color key table and FIG. 6 is an exemplary color mapping to an exemplary security-enhanced icon using illustrative visual enhancement color enhancement lookup table 500. Each block 300 of icon 202 (FIG. 3b) is colored according to color key 500 (FIG. 5). More specifically, as illustrated in FIG. 6, six single digits of the IMEI 600 are mapped 602 to six blocks 300 of icon 202. Six digits are used herein, although not required, because six digits of the IMEI correspond to the device's serial number; the other digits may correspond to (depending on whether Old IMEI, New IMEI, Old International Mobile Equipment Identity and Software Version number (IMEISV), or New IMEISV is used) the Type Allocation Code (TAC), Final Assembly Code (FAC), a checksum, and/or software verification number. More or less IMEI digits can be mapped, including the entire IMEI.

Referring again to FIGS. 5 and 6, each digit 502 of the portion of the IMEI 600 used is mapped 602 to a certain color 504, and that color 504 is displayed in a block 300 of icon 202 such that the coding personnel know which block corresponds to which digit of the IMEI using visual enhancement lookup table 500. For example, color "#EEB422" is illustrated herein as a star pattern; color "#8B7355" is illustrated as circles, and color "#B0C4DE" is illustrated as horizontal dotted lines. Although certain colors are illustrated herein, it is not limited to the use of any certain colors; the colors are merely illustrative. It is preferred, although in no way required, that the colors chosen be visually distinct from each other such as those illustrated, although not required, in FIG. 5. The disclosure also contemplates the use of other colors and other devices for visually enhancing an object based on a coding device, such as the use of other visual enhancement devices including, but not limited to, shading, icons, letters, numbers, characters, images, textures, shapes, patterns, and cross-hatching or portion or combination thereof. Indeed, the unique identifier need not be directly mapped to the visual enhancement as illustrated in FIG. 5. It is contemplated, although not required, that use of the unique identifier, or portion thereof, can be a seed for a value generator that takes an input (such as the unique identifier and/or any value) and returns a value, including, but not limited to, a string, letter, number, character, symbol, image, integer, or array based on an algorithm (including, but not limited to, altering the seed, multiplying the seed, reducing the seed, adding to the seed, subtracting from the seed, dividing the seed, and encrypting the seed or portion or combination thereof) and that resulting value is then used to map to the visual enhancements using a visual enhancement lookup table. Moreover, characters illustrated as numbers 502 are used as the codes corresponding to the visual enhancement (illustrated here as colors), but codes are not limited to numbers; rather, it is contemplated that other codes may be used, including but not limited to, letters, numbers, characters, integers, strings, symbols, arrays, in whole or any combination thereof.

Although all the blocks of icon 202 were changed in the conversion from unenhanced icon 104 (FIGS. 1 and 3a) to enhanced icon 202 (FIGS. 2, 3b, and 6), they need not be. In other words, only the portions of the image that correspond to the portions of the mapped unique identifier (such as an IMEI) need to be changed—the rest were altered for visual continuity so that the security enhancement is less obvious to the end user, which is not required although beneficial for reducing detectability by the end user. In other words, with a change from an all white graphic to a colored graphic, the user is likely to think the device is just improving the user experience with better graphics.

Furthermore, although use of IMEI is illustrated in this exemplary embodiment, the disclosure contemplates use of any identifier unique to a computing device or group of devices, be it a mobile or stationary computing device, such as, but not limited to, a serial number, ESN, MEID, IMSI MSISDN, or any other identifier including, but not limited to, numbers, letters, symbols, strings, characters, images, and/or identifiers or any portion or combination thereof, wherein portions or all of the identifier can be mapped to certain visual enhancements of an object and depicted on a graphical user interface, such object including, but not limited to, an icon, application, desktop, wallpaper, background, border, web-based home screen, network-based home screen, network-based desktop, portion of the screen, the entire screen, application tray, any other graphical object, or portion or combination thereof.

Referring again to FIGS. 3b and 6, icon 202 is illustrated having optional pure white block 302a and blue block 302b (illustrated herein as a blank block and block having horizontal lines with varying thicknesses, respectively). Pure white block 302a and blue block 302b are used as a device for calibrating the security enhancement by calibrating the colors (or other imaging devices) in the other blocks 300. One reason calibration blocks 302a and 302b are helpful is because colors often alter their saturation and appearance when captured using different devices. For example, different cameras will capture different colors in different saturations. To know what colors the device initially placed in each portion of icon 202, calibration blocks 302a and 302b are used as a device to calibrate icon 202 back to its intended color; here, pure white and blue are illustrated, but others are contemplated, including but not limited to, other colors, letters, numbers, characters, shading, icons, images, shapes, patterns, cross-hatching, and textures or portion or combination thereof; moreover, while the use of two calibration blocks are illustrated herein, additional or fewer calibration blocks, including none, can be used.

One benefit of using such a device as that illustrated herein to security-enhance a graphical object (such as, but not limited to, an icon, application, desktop, wallpaper, background, border, portion of the screen, the entire screen, web-based home screen, network-based home screen, network-based desktop, application tray, any other graphical object, or portion or combination thereof) is that the end-user is unlikely to notice it and attempt to defeat it because it is integrated into the graphical user interface. Moreover, the security enhancement devices are not dependent upon metadata which can be easily modified or deleted. Furthermore, the security enhancement devices are not dependent on being captured by the device itself; in other words, the security features remain even if the screenshot is captured by a means other than the computing device itself, such as an external camera. Additionally, the security feature is not disruptive and will not interfere with the user's experience.

Figure 7:
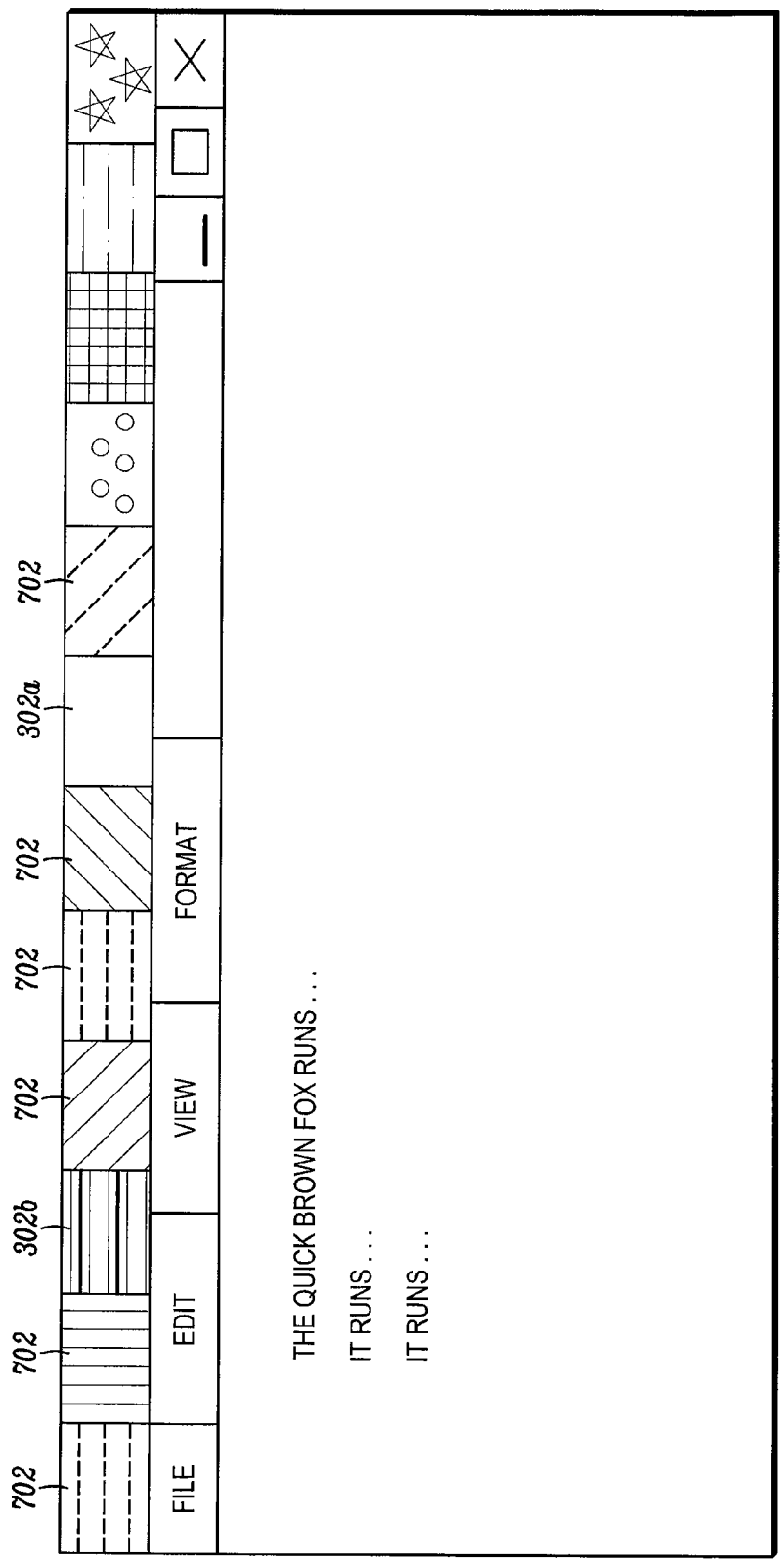
FIG. 7 is an exemplary security-enhanced application.

The security device can be used with any object, portion thereof, or combination thereof and is not limited to use on icons. For example, FIG. 7 illustrates a security-enhanced computer software application 700 having a security-enhanced border 702 that is rendered based on a color mapping of digits of the IMEI.

Figure 8:
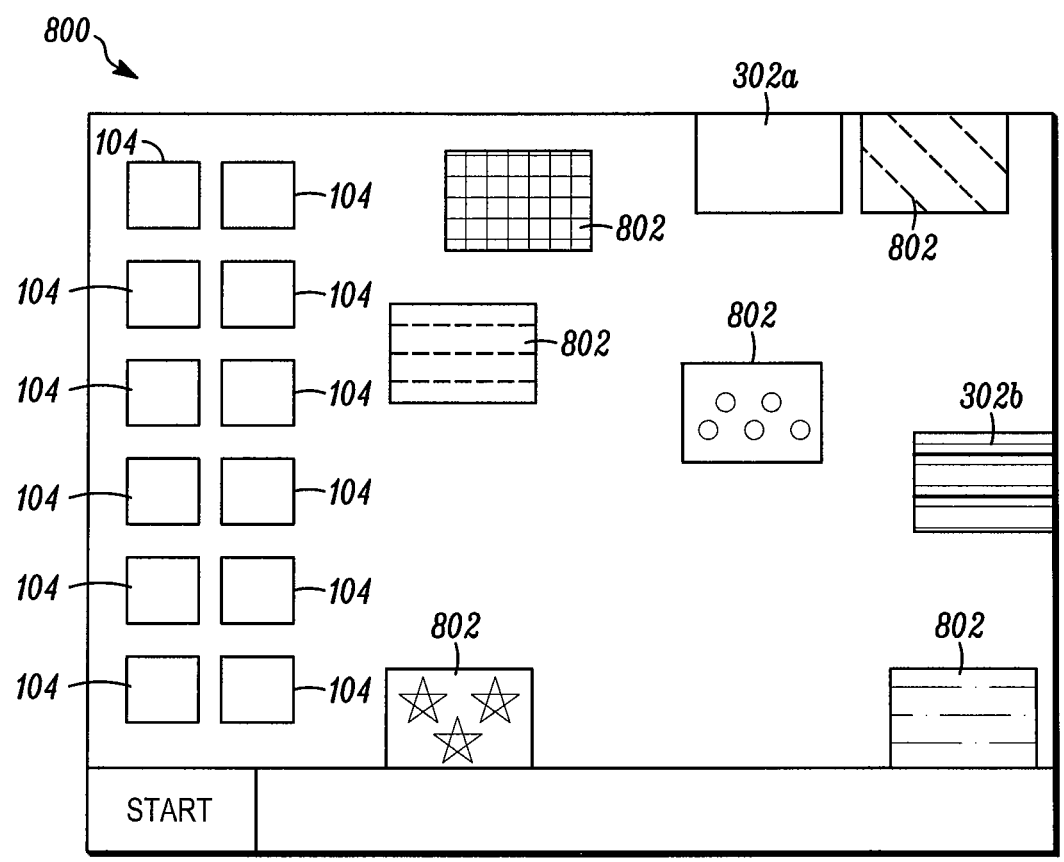
FIG. 8 is an exemplary security-enhanced desktop.

FIG. 8 illustrates an enhanced desktop 800 of a computing device wherein portions (or at least one portion) of the desktop is enhanced 802 with colors (or other visual security enhancements) that map to digits or characters (or portion or combination thereof) of a unique identifier, such as a serial number, ESN, MEID, IMSI MSISDN, or any other identifier including, but not limited to, numbers, letters, symbols, strings, characters, images, and/or identifiers or any portion or combination thereof of a computing desktop system.

Figure 9:
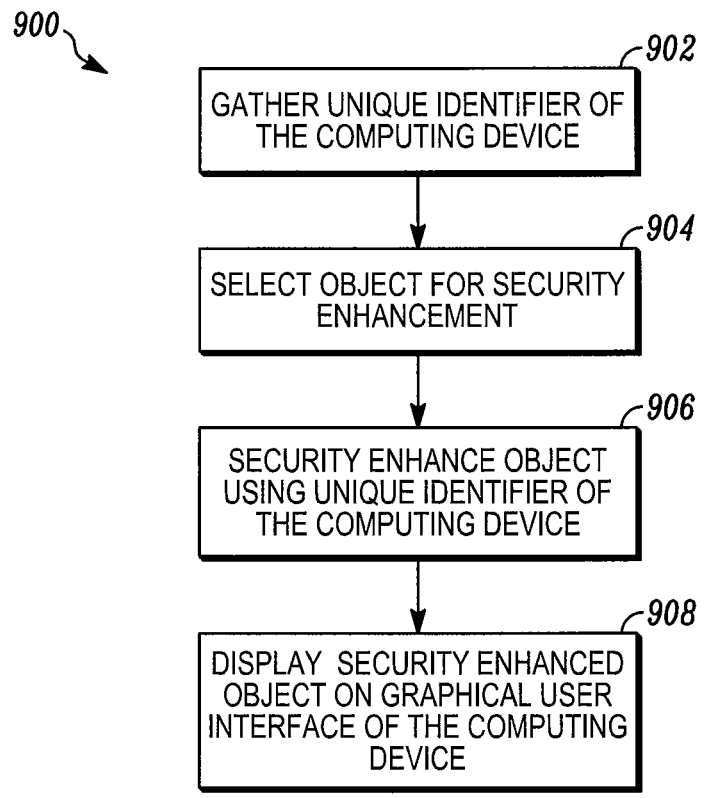
FIG. 9 is an exemplary flow chart illustrating a method for security enhancing a device.

FIG. 9 is an exemplary flow chart illustrating a method for security enhancing a device. The method illustrated 900 can be used with any computing device having a unique identifier. The method includes a device for gathering unique identifier of the computing device, at block 902, such as Android requesting it from Radio Interface layer (the unique identifier can be obtained by using any service/component of the device that provides access to the unique identifier, including but not limited to, the phone APIs of Android, Modem Service APIs, Radio Interface layer APIs, etc.), returning the requested information, and saving it to a retrievable location, wherein the unique identifier may be an identifier unique to a computing device or group of devices, including but not limited to, the IMEI, serial number, ESN, MEID, IMSI MSISDN, or any other identifier including, but not limited to, numbers, letters, images, symbols, or other characters and identifiers or portion or combination thereof. The object for security enhancements is selected, at block 904, which includes but is not limited to objects such as icons, applications, desktops, wallpapers, backgrounds, borders, portions of the screen, the entire screen, web-based home screen, network-based home screen, network-based desktop, application tray, and any other graphical object or portion or combination thereof. The object selected is then enhanced by a security enhancement device, at block 906, such as applying security-features by using the unique identifier of the device by mapping at least a portion of that unique identifier to visual enhancements stated on a visual enhancement lookup table that includes, but is not limited to, colors, letters, numbers, characters, shading, icons, images, shapes, patterns, cross-hatching, and textures or portion or combination thereof, coding the object selected corresponding to the visual enhancement lookup table and the unique identifier of the computing device, and using a displaying device to display the security-enhanced object on the graphical user interface, at block 908, such as graphic rendering computer program that is programmed to render the resulting security-enhanced object on at least a portion of the graphical user interface of the computing device.

Figure 10:
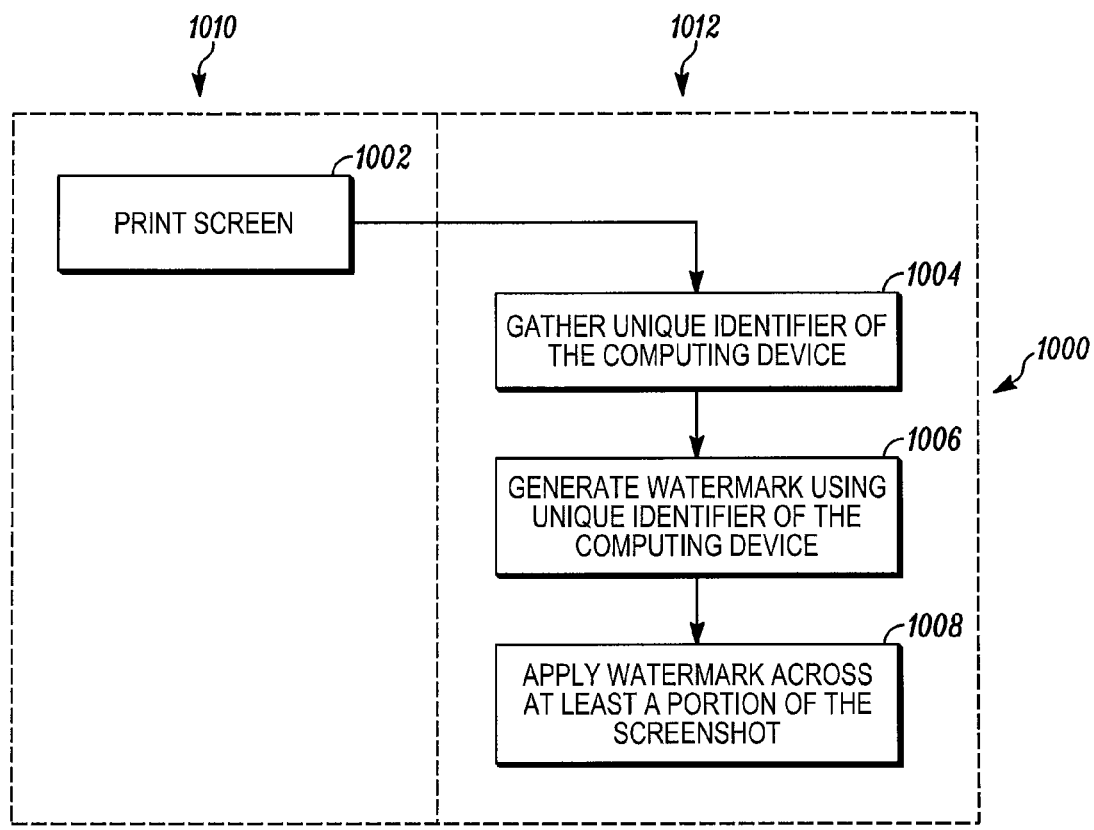
FIG. 10 is an exemplary flow chart illustrating a method for security enhancing a device using a watermark.

An additional device for protecting a computing device using graphical user interface security enhancements is the use of a webtop watermark. FIG. 10 is an exemplary flow chart illustrating a method for security enhancing a device using a watermark 1000 and interaction between user 1010 and computer program 1012. As illustrated in FIG. 10, user 1010 runs the print-screen/screenshot/screen-capture function, at block 1002, the program 1012 responds to it and gathers the unique identifier of the computing device, at block 1004 (such as by Android requesting it from Radio Interface layer, returning the requested information, and saving it to a retrievable location), and generates a watermark using at least a portion of the unique identifier of the device, at block 1006, by for example, creating a watermark stating the IMEI, portion of the IMEI, or an encrypted IMEI as well any other information, including but not limited to, "Copyright," the year, and the vendor company's name. Program 1012 then applies the watermark across at least a portion of the screenshot, at block 1008; for example, watermark can be applied over the entire screenshot or as much as necessary to protect sensitive information (i.e., information, graphics, functionality, objects, etc. that are not yet intended to be known to the public).

Figure 11:
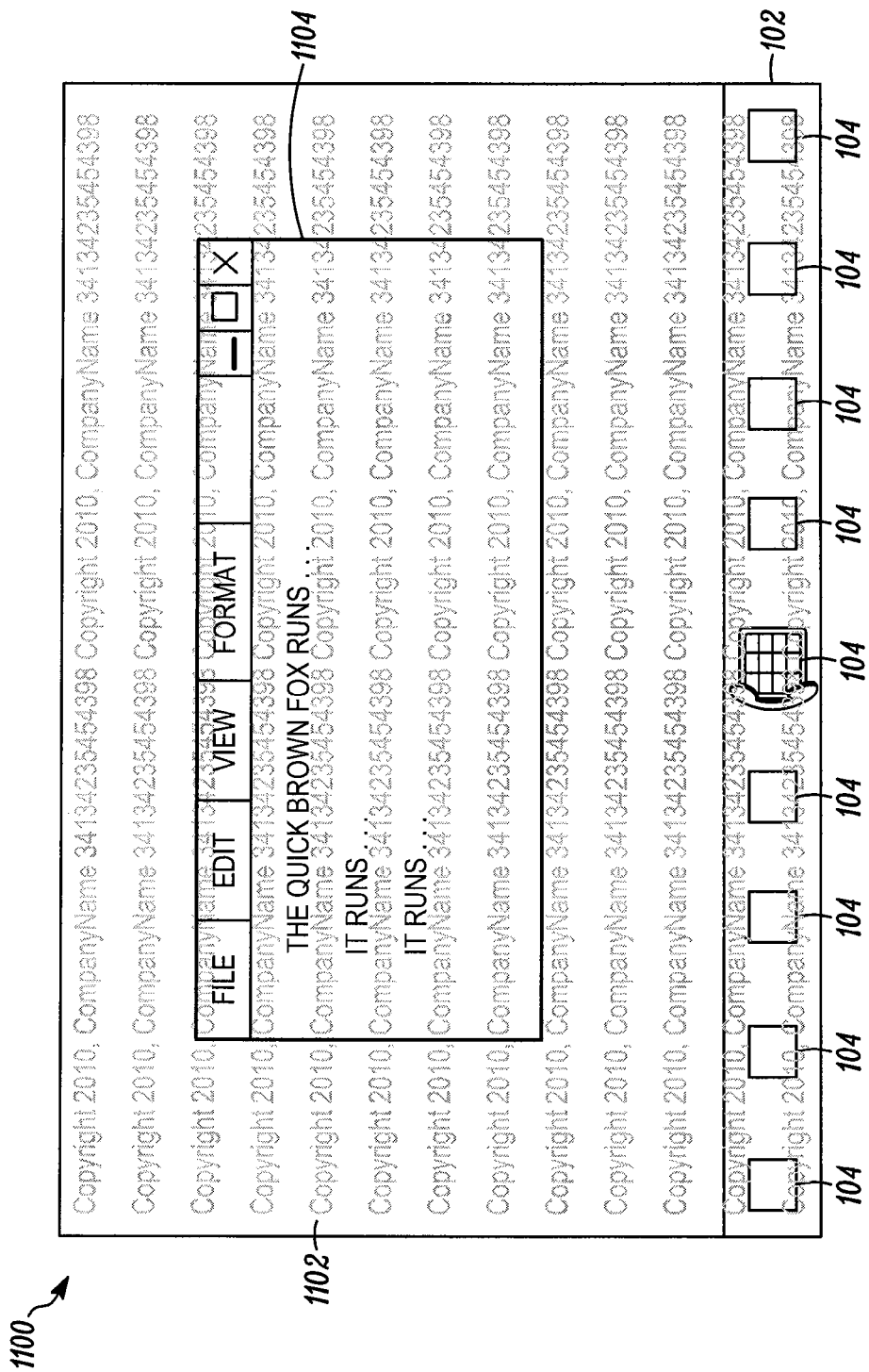
FIG. 11 is an exemplary security-enhanced watermarked webtop.

FIG. 11 is an exemplary security-enhanced watermarked webtop. Watermark 1102 is generated when user uses the print-screen/screenshot/screen-capture functionality of the computing device. Watermark 1102 can include any information, including but not limited to a unique device identifier for tracing the print-screen/screenshot/screen-capture back to the original computing device or group of devices from where it came. As with the unique identifier illustrated in FIG. 10 and throughout, the unique device information may include, but is not limited to, the IMEI, serial number, ESN, MEID, IMSI MSISDN, or any other identifier including, but not limited to, numbers, letters, images, symbols, or other characters and identifiers or portion or combination thereof. Indeed, it is contemplated, although not required, that use of the unique identifier, or portion thereof, can be a seed for a value generator that takes an input (such as the unique identifier and/or any value) and returns a value, including, but not limited to, a string, letter, number, character, symbol, image, integer, or array based on an algorithm (including, but not limited to, altering the seed, multiplying the seed, reducing the seed, adding to the seed, subtracting from the seed, dividing the seed, and encrypting the seed or portion or combination thereof) and that resulting value may be displayed on locations including, but not limited to, the webtop, desktop, image, icon, application, web-based home screen, network-based home screen, network-based desktop, wallpaper, background, border, portions of the screen, the entire screen, application tray, and any other graphical object or portion or combination thereof.

As illustrated in FIG. 11, embedded within screenshot 1100 is watermark 1102 that displays unobtrusively over the entire image, including any open application 1104. Thus, watermark 1102 does not prevent screenshot 1100 from being viewed, but instead, it presents, in an unobtrusive manner, the information necessary to trace the image back to the original computing device or group of devices. Moreover, because watermark 1102 is unobtrusive, it is likely to go unnoticed by a user. Defeating watermark 1102 will prove difficult because watermark 1102 is embedded over the entire image (or, alternatively, portions of it containing sensitive information), such that if a user were to use photo editing program to attempt to remove watermark 1002, the resulting image would be essentially useless. Watermark 1102 may include other optional information beside the device identifier including, but not limited to, ownership and copyright information.

From the foregoing, it can be seen that the present disclosure provides an improved method and device for enhancing security of an object. Device identification information which is unique to that device is embedded into visual features such as objects of the graphical user interface. The embedded information is added in a manner to be unobtrusive to the user but to be visible upon viewing or even photographing the device. The information may be embedded using colors, patterns or other visual indicia or any combination. Moreover, screenshots may be watermarked for added security. With these features in place, if a device is leaked or stolen, it may be identified and appropriate measures taken.

What is claimed is:

1. A method for security enhancing an object, the method comprising:
   gathering a unique identifier of a computing device;
   selecting an object for security enhancement;
   enhancing the object by using at least a portion of the unique identifier of the computing device, wherein the enhancing the object further comprises:
   selecting at least one character from the unique identifier of the computing device;
   selecting at least one area of the object to be security-enhanced;
   selecting a color from a visual enhancement lookup table that corresponds to the selected at least one character from the unique identifier of the computing device; and
   coloring the selected at least one area of the object to be security-enhanced using the color selected from the visual enhancement lookup table; and
   displaying the enhanced object on a graphical user interface of the computing device.

2. The method of claim 1 further comprising calibrating the enhanced object using a device configured to calibrate the security enhancement.

3. The method of claim 1 wherein the graphical user interface of the computing device comprises a webtop.

4. The method of claim 1 wherein the computing device comprises a mobile phone, satellite phone, mobile personal computer, netbook, laptop computer, handheld computer, smart phone, navigation system, personal digital assistant (PDA), calculator, music player, MP3 player, tablet computer, or desktop computer.

5. A method for security enhancing an object, the method comprising:
   gathering a unique identifier of a computing device;
   apply a security enhancement to an icon on a graphical user interface coded to correspond to a visual enhancement lookup table and the unique identifier of the computing device, wherein the applying the security enhancement further comprises: selecting the icon; and
   coloring the icon corresponding to at least one character of the unique identifier that corresponds to the visual enhancement lookup table; and
   displaying the security enhancement of the icon on the graphical user interface.

* * * * *